US006853560B2

(12) United States Patent
Borcherding et al.

(10) Patent No.: US 6,853,560 B2
(45) Date of Patent: Feb. 8, 2005

(54) LIMITED MOVEMENT SYSTEM FOR MOTOR SWITCH MOUNTED THERMO-PROTECTOR

(75) Inventors: Gary W. Borcherding, Florissant, MO (US); Barry M. Newberg, Florissant, MO (US); Ranney Dohogne, Creve Coeur, MO (US); William R. Lewis, Hazelwood, MO (US); Paul G. Michaels, Arnold, MO (US)

(73) Assignee: Emerson Electric Co., St. Louis, MO (US)

( * ) Notice: Subject to any disclaimer, the term of this patent is extended or adjusted under 35 U.S.C. 154(b) by 181 days.

(21) Appl. No.: 10/099,297

(22) Filed: Mar. 15, 2002

(65) Prior Publication Data

US 2003/0174486 A1 Sep. 18, 2003

(51) Int. Cl.[7] .............................. H05K 7/02; H05K 7/04
(52) U.S. Cl. ...................... 361/809; 361/752; 361/753; 361/758; 361/759; 361/801; 361/802
(58) Field of Search ............................... 361/752, 753, 361/796, 785, 787, 809, 758, 759, 801, 802, 756

(56) References Cited

U.S. PATENT DOCUMENTS

| | | | | |
|---|---|---|---|---|
| 4,214,389 A | | 7/1980 | Fitzgerald et al. | |
| 5,088,190 A | * | 2/1992 | Malhi et al. | 29/843 |
| 5,537,294 A | * | 7/1996 | Siwinski | 361/753 |
| 5,659,459 A | * | 8/1997 | Wakabayashi et al. | 361/753 |
| 5,906,496 A | * | 5/1999 | DelPrete et al. | 439/95 |
| 6,036,536 A | | 3/2000 | Chiu | |
| 6,276,965 B1 | * | 8/2001 | Madsen et al. | 439/607 |
| 6,456,504 B1 | * | 9/2002 | LoForte et al. | 361/799 |
| 6,462,952 B1 | * | 10/2002 | Ubukata et al. | 361/719 |

* cited by examiner

Primary Examiner—Amir Zarabian
Assistant Examiner—Thanh Y. Tran
(74) Attorney, Agent, or Firm—Thompson Coburn, LLP (57) ABSTRACT

A mounting clip that attaches a circuit component to an electrical device attenuates vibration of the circuit component as the electrical device is operated. The mounting clip is designed for a thermo-protector of an electric motor and removably attaches the thermo-protector to a switch housing of the electric motor. The thermo-protector is connected in the circuit of the electric motor and wiring of the electric motor that communicates with the thermo-protector is attached to the mounting clip. The mounting clip is provided with a spring mechanism that engages an abutment provided on the switch housing and biases the mounting clip and the attached thermo-protector and thermo-protector wiring away from the switch housing and thereby attenuates vibration of the thermo-protector and its wiring.

17 Claims, 3 Drawing Sheets

LIMITED MOVEMENT SYSTEM FOR MOTOR SWITCH MOUNTED THERMO-PROTECTOR

BACKGROUND OF THE INVENTION (1) Field of the Invention

The present invention pertains to an improved mounting clip that attaches a circuit component to an electrical device and attenuates vibration of the circuit component and its wiring as the electrical device is operated. More specifically, the present invention pertains to a mounting clip for a thermo-protector that removably attaches the thermo-protector to a switch housing of an electric motor. The thermo-protector is connected to the stator windings of the electric motor. The wiring of the electric motor connected to the thermo-protector is attached to the mounting clip. The mounting clip is provided with a spring mechanism that engages an abutment provided on the switch housing and biases the mounting clip and the attached thermo-protector and thermo-protector wiring away from the switch housing and thereby attenuates vibration of the thermo-protector and its wiring.

(2) Description of the Related Art

Electrical devices, and in particular electric motors, are often provided with thermo-protectors that are connected to the stator winding of the electric motor. The thermo-protector limits the temperature of the electric motor wiring during operation of the electric motor. In this manner the typical thermo-protector protects the wiring of the electric motor, as well as other circuit components of the electric motor, from damage due to excessive heat generated by the current passing through the motor windings.

Figure 1:
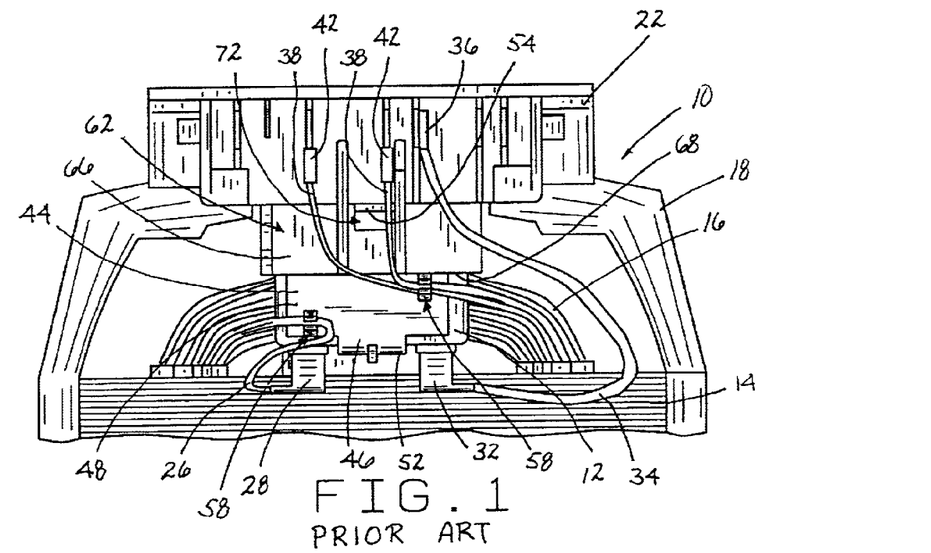
FIG. 1 is a partial side view of a prior art electrical device, or electric motor, showing the prior art mounting clip removably attaching a thermo-protector circuit component to a switch housing of the motor.

FIG. 1 shows one illustrative environment of a prior art electric motor 10 having a thermo-protector 12 as a circuit component in the winding of the motor. Because the electric motor 10 and the thermo-protector 12 shown in FIG. 1 are known, they are represented schematically in the drawing figure and only a portion of the motor is shown.

The motor 10 includes a stator comprised of stator laminate plates 14 and magnetic wiring wrapped around the poles of the stator (not shown). The end turns 16 of the stator magnetic wiring 16 are shown projecting from one end of the stack of stator laminate plates 14. An end shield or end cage 18 is also shown in FIG. 1 and a switch housing 22 is shown attached to the end cage.

The circuit component or thermo-protector 12 of the illustrative example has a narrow, box shaped configuration. The thermo-protector is shown connected to a lead 26 of the stator winding. The winding lead 26 is connected to a terminal 28 of the circuit component. A second terminal 32 of the circuit component is connected by a length of wire 34 to a terminal 36 of the switch housing. Additional stator winding leads 38 are connected to other terminals 42 of the switch housing.

The thermo-protector is releasably attached to the switch housing 22 by a mounting clip 44. The mounting clip 44 has an elongate, generally rectangular base 46 and an elongate, generally rectangular support panel 48. The base and support panel intersect each other and give the mounting clip a cross configuration. A pair of resilient flanges 52 project from opposite ends of the base to one side of the base. An attachment hook 54 projects from the opposite side of the base. Each of the flanges 52 have tabs 56 projecting from the flange distal ends. The pair of tabs 56 project toward each other.

Figures 1, 2, 3, 4:
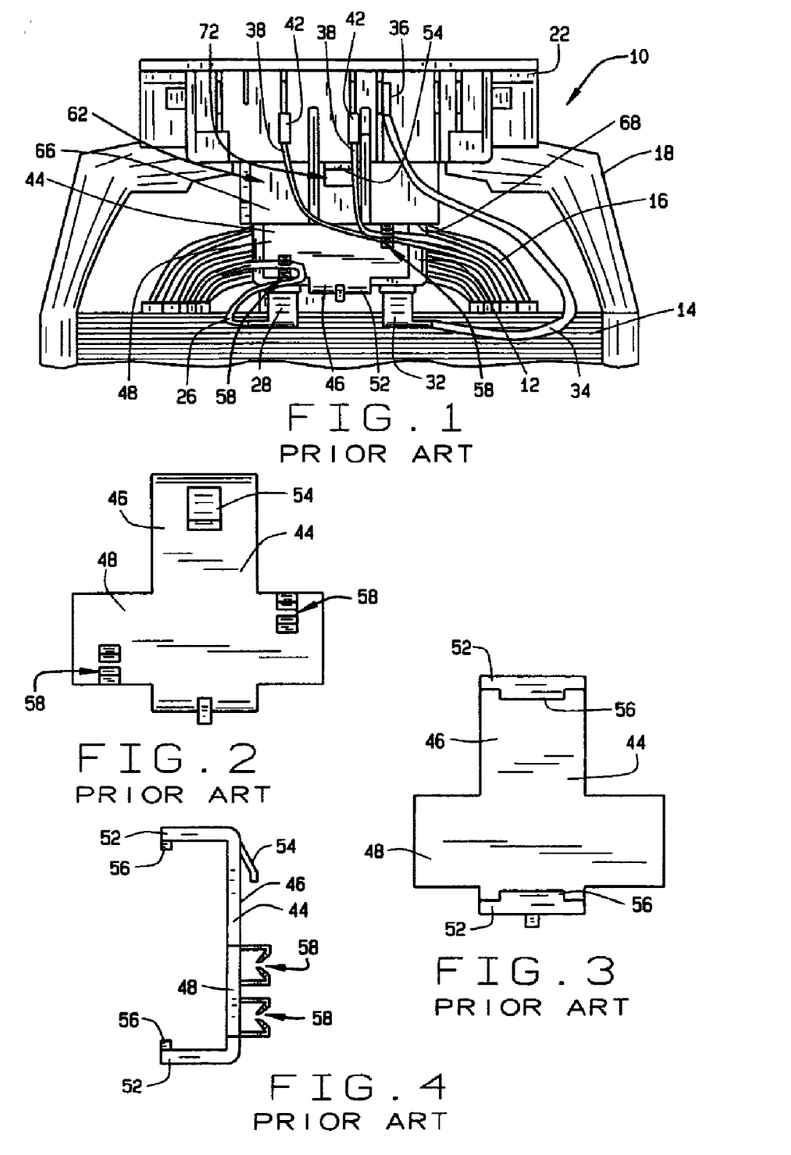
FIG. 2 is a plan view of the prior art mounting clip.
FIG. 3 is a plan view of the opposite side of the prior art mounting clip shown in FIG. 2.
FIG. 4 is a side view of the mounting clip shown in FIG. 2.
Figures 2, 3, 4:
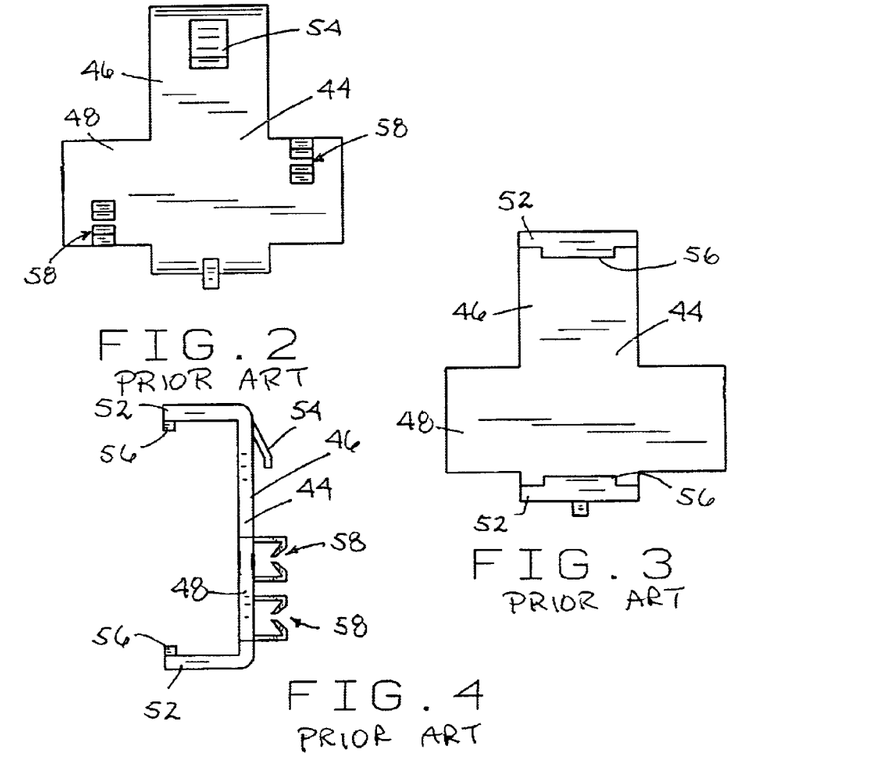

The prior art mounting clip 44 is typically constructed of plastic, giving the pair of base flanges 52 a flexibility or resilience. The opposed tabs 56 and the resilience of the base flanges 52 enable the mounting clip 44 to be releasably attached to the circuit component 12 by passing the flanges 52 over opposite sides of the component, with the flange tabs 56 engaging in slots in opposite sides of the circuit component. In this manner, the mounting clip 44 is removably attached to the circuit component 12, meaning that the clip is attached to the component without separate fasteners. By being removably attached to the component, the mounting clip 44 can be easily manually attached and removed from the circuit component 12 without separate fasteners and without damaging parts of the mounting clip.

The support panel 48 of the mounting clip has a pair of wiring clasp assemblies 58 that project outwardly from one side of the panel. The stator winding leads 26, 38 are pressed between the opposed clasps of the two clasp assemblies 58 to removably attach the wiring leads to the support panel of the mounting clip 44 as shown in FIG. 1.

In attaching the circuit component 12 to the switch housing 22 employing the mounting clip 44 of the prior art, the clip 44 is first removably attached to one side of the thermo-protector circuit component 12. The clip is positioned with its flanges 52 adjacent opposite sides of the circuit component 12 and then is pressed onto the component. The clip flanges 52 are caused to flex away from each other and the tabs 56 of the flanges pass over the opposite sides of the circuit component until they engage in the slots (not shown) in the opposite sides of the component. This removably attaches the mounting clip 44 to the circuit component 12.

Figure 5:
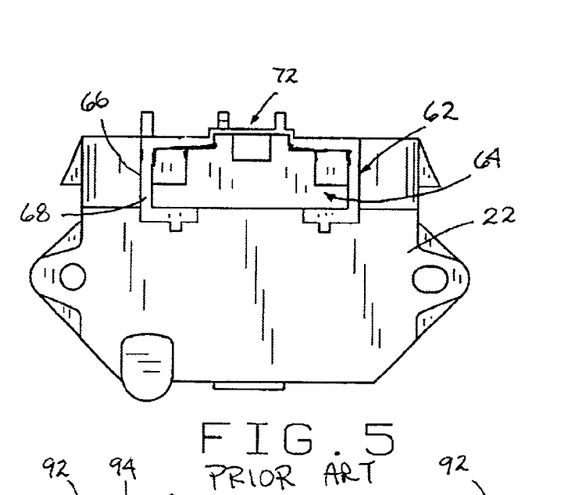
FIG. 5 is a plan view of the prior art switch housing.

The clip and component are then assembled to the switch housing 22. The switch housing 22 is provided with a receptacle 62 having an interior volume 64 that is configured to receive at least a portion of the circuit component 12 and the mounting clip 44 attached to the component. A side wall 66 of the receptacle surrounds the interior volume 64. An edge 68 of the receptacle side wall defines a receptacle opening through which the circuit component and attached mounting clip are inserted. The receptacle side wall has a smaller side wall opening 72 at the back of the receptacle interior volume 64 from the receptacle opening. As the component 12 and attached mounting clip 44 are inserted through the receptacle opening and into the receptacle interior volume 64, the attachment hook 54 projecting from the mounting clip base 46 engages in the side wall opening 72 and thereby releasably attaches the circuit component 12 and the mounting clip 44 to the switch housing 22. The stator winding leads are connected to the clasp assemblies 58 as shown in FIG. 1.

The mounting clip 44 of the prior art described above functions well in providing a removable attachment between the circuit component or thermo-protector 12 and a housing of the electric motor 10, specifically the switch housing 22. The releasable attachment of the mounting clip 44 to the circuit component 12 and to the switch housing receptacle 62 enables a quick and easy attachment of the circuit component to the electric motor without the need for separate fasteners. However, during use of the electric motor 10, problems associated with the use of the mounting clip 44 were discovered.

Because the mounting clip 44 is releasably attached or snapped to the circuit component 12 and is then releasably attached or snapped to the receptacle 62 of the switch housing 22, during operation of the motor 10 vibrations from the motor were transmitted to the mounting clip. The vibrations of the mounting clip were also transferred to the stator winding leads 26, 38 held in the clasp assemblies 58 of the mounting clip. The vibration of these leads caused them to rub across each other which at times caused the insulation of the winding leads to wear away, resulting in a short circuit between the leads.

What is needed to overcome the problem with the prior art mounting clip is a means of attenuating the vibration of the clip when the electrical device is operated which in turn will attenuate the vibration of the circuit components and the rubbing together of the circuit component wiring.

SUMMARY OF THE INVENTION

The present invention provides a system of limiting the movement of a circuit component mounted to the housing of an electrical device and the relative rubbing and wearing away of the circuit component wiring insulation. In the illustrative embodiment of the invention, the system limits the movement of a thermo-protector relative to a switch housing of an electric motor. However, the system is equally well suited for use in other environments.

The invention basically provides a modification to the prior art mounting clip and prior art switch housing described above that attenuates vibration of the thermo-protector mounted to the switch housing and the rubbing together of the circuit component wiring leads.

The mounting clip of the invention is basically constructed as the prior art mounting clip with an improvement. A slot is provided in the support panel of the mounting clip. The slot is positioned adjacent a corner of the rectangular shaped support panel and as it extends into the support panel, it sets apart a portion of the mounting clip panel between the slot and the edge of the support panel. This set apart portion of the support panel forms a narrow, elongate spring arm extending along the peripheral edge of the panel.

The switch housing of the invention is modified with an abutment on the edge of the switch housing receptacle wall adjacent the receptacle opening. The abutment projects outwardly, away from the receptacle wall edge.

The mounting clip is removably attached to the thermo-protector circuit component in the same manner as the prior art mounting clip. The mounting clip is then attached to the receptacle of the switch housing in the same manner as the prior art mounting clip and switch housing. However, the abutment on the receptacle wall of the switch housing and the spring arm on the mounting clip are positioned so that a distal end of the spring arm will come into engagement with the abutment as the mounting clip and attached circuit component are inserted into the receptacle of the switch housing. As the mounting clip and attached circuit component are attached to the receptacle of the switch housing, the spring arm is resiliently flexed by the abutment. Thus, with the mounting clip and circuit component removably attached to the switch housing, the resilience of the spring arm exerts a force on the abutment of the switch housing that biases the mounting clip and attached circuit component away from the switch housing receptacle. This biasing force exerted by the spring arm attenuates vibration of the mounting clip and the rubbing together of the attached circuit component wiring leads during operation of the motor. In this manner, the apparatus of the invention attenuates the wearing away of the insulation on the wiring leads of the thermo-protector circuit component and overcomes the disadvantages associated with the prior art mounting clip and switch housing.

BRIEF DESCRIPTION OF THE DRAWINGS

Further features of the invention are revealed in the following detailed description of the preferred embodiment of the invention and in the drawing figures wherein.

DETAILED DESCRIPTION OF THE PREFERRED EMBODIMENT

Figure 8:
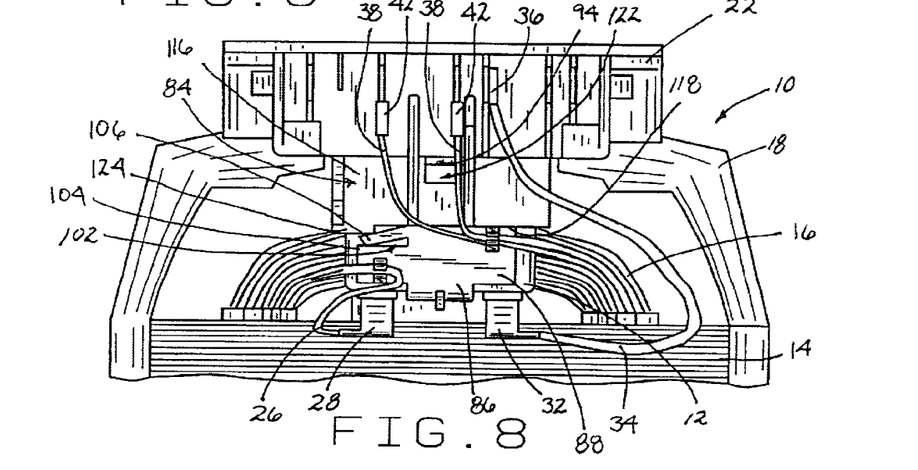
FIG. 8 is a partial view similar to that of FIG. 1 but showing the mounting clip and switch housing of the invention assembled to each other.
Figure 9:
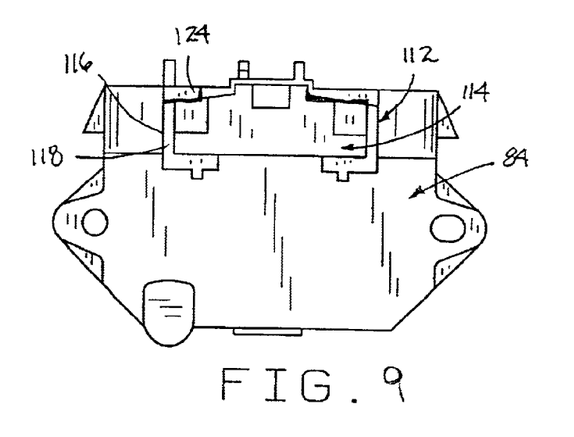
FIG. 9 is a plan view of the modified switch housing of the invention.
Figures 10, 11, 12:
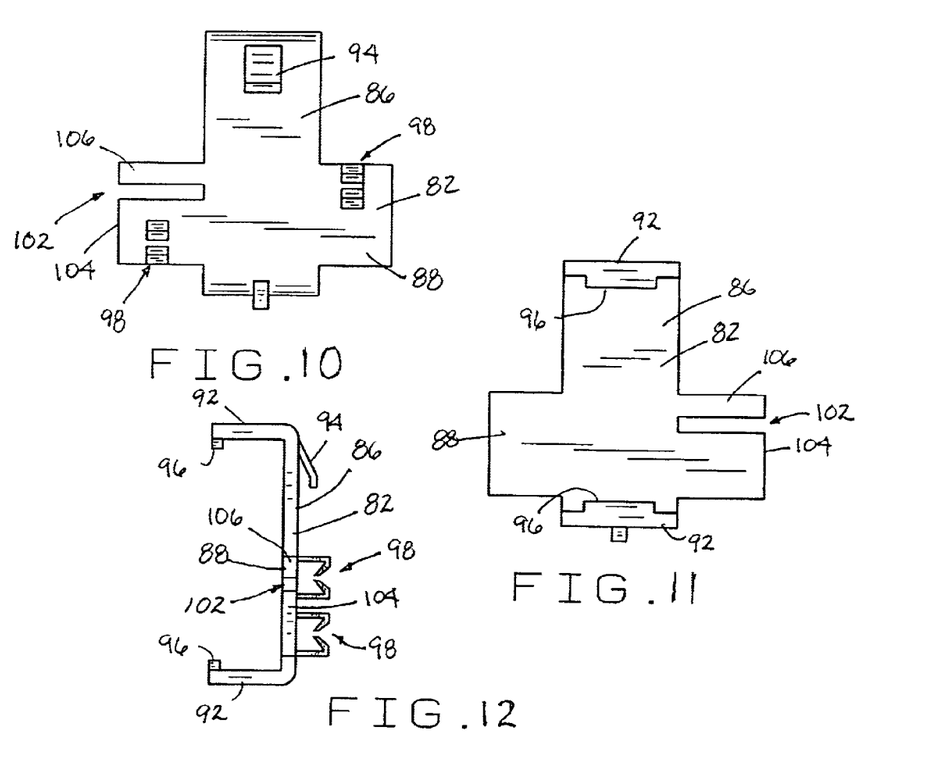
FIG. 10 is a plan view of the modified mounting clip of the invention.
FIG. 11 is a plan view of the opposite side of the mounting clip shown in FIG. 10.
FIG. 12 is a side view of the mounting clip shown in FIG. 10.

The novel system of the invention that attenuates the vibration and rubbing together of electric wiring leads of a circuit component mounted to a housing of an electrical device is basically comprised of a modified mounting clip 82 shown in FIGS. 10–12 and a modified switch housing 84 shown in FIGS. 8 and 9. In the illustrative example of the invention to follow, the system is described as limiting the movement of a thermo-protector circuit component relative to a switch housing of an electric motor and thereby attenuating rubbing together of the components wiring leads. However, the mounting clip 82 and its associated switch housing 84 may be employed to removably attach other types of circuit components to other types of electrical devices. In the preferred embodiment, both the mounting clip 82 and switch housing 84 are constructed of a plastic, however other similar types of materials may also be employed.

The mounting clip 82 has a construction that is very similar to that of the prior art mounting clip 44. It is also provided with an elongate, generally rectangular base 86 and an elongate, generally rectangular support panel 88. The base and support panel also intersect with each other and give the mounting clip a cross configuration. A pair of resilient flanges 92 project from opposite ends of the base and extend to one side of the base as shown in FIG. 12. An attachment hook 94 projects outwardly from the opposite side of the base. Each of the flanges 92 are provided with projecting tabs 96 at their distal ends. The tabs 96 project toward each other as shown in FIG. 12. A pair of wiring clasp assemblies 98 project outwardly from the support panel 88 on an opposite side of the clip from the pair of flanges 92.

The modified mounting clip 82 differs from the prior art mounting clip in that it is also provided with an elongate slot 102 that extends into the support panel 88 from an edge 104 of the panel. The slot 102 is formed in the panel adjacent a corner of the panel and sets apart a portion 106 of the panel as a narrow, elongate spring arm mechanism projecting outwardly from and integral with the panel. The rectangular configuration of the support panel 88 and the configuration of the slot 102 extending along a straight line through the panel gives the spring arm 106 a narrow, straight configuration that cantilevers outwardly from the support panel.

The modified switch housing 84 of the invention is also constructed in a similar manner to that of the prior art switch housing 22. The view of the housing 84 shown in FIG. 9 is turned 90 degrees about a horizontal axis from the position of the prior art housing 22 shown in FIG. 8. The switch housing includes a receptacle 112 that has an interior volume 114 that is dimensioned and configured to receive at least a portion of the thermo-protector circuit component 12 and the modified mounting clip 82 attached to the component. A receptacle side wall 116 extends at least partially around the receptacle interior volume 114. An outward edge 118 of the receptacle side wall 116 defines the receptacle opening to the receptacle interior volume. An attachment hook opening 122 is provided through the receptacle side wall 116 at the back of the receptacle interior volume 114 opposite the receptacle opening.

The modified switch housing 84 differs from the prior art switch housing 22 by also including an abutment 124 that projects outwardly from the side wall edge 118 of the receptacle. The abutment 124 projects in a direction that is opposite to the direction of insertion of the clip 82 and thermo-protector 12 when assembling the clip and protector to the switch housing. The abutment 124 also projects in a direction that is transverse to the direction that the spring arm mechanism 106 projects from the support panel 88 when the mounting clip 82 is removably attached to the switch housing 84.

Figure 6:
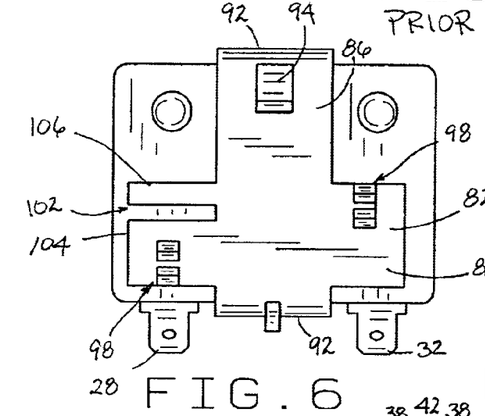
FIG. 6 is a plan view of the mounting clip of the invention removably attached to the thermo-protector circuit component.
Figure 7:
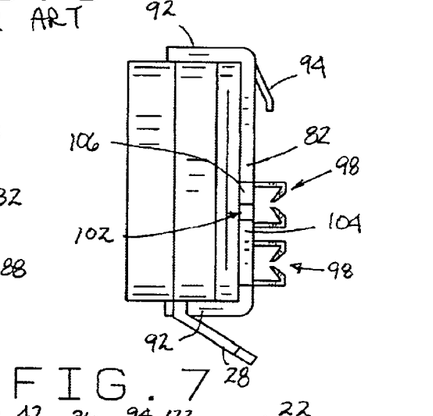
FIG. 7 is a side view of the mounting clip and circuit component shown in FIG. 6.

The modified mounting clip 82 is attached to the thermo-protector 12 in the same manner as the prior art mounting clip. The clip 82 is positioned with its flanges 92 adjacent opposite sides of the thermo-protector 12 and then is pressed onto the protector. The clip flanges 92 are caused to resiliently flex away from each other and the flange tabs 96 pass over the opposite sides of the protector until they engage in slots (not shown) in the opposite sides of the protector. This removably attaches the mounting clip 82 to the protector 12 in the relative positions of the clip and protector shown in FIGS. 6 and 7.

The clip 82 and protector 12 are then removably attached to the modified switch housing 84. With the orientation of the switch housing 84 shown in FIG. 9, the mounting clip 82 with the removably attached protector 12 is positioned so that the clip is above the protector and the attachment hook end of the clip is first inserted through the receptacle opening defined by the side wall edge 118. FIG. 8 shows the switch housing of FIG. 8 turned 90 degrees about a horizontal line. The positioning of the switch housing 84 shown relative to the electric motor 10 in FIG. 8 is the same orientation of the prior art switch housing 22 shown relative to the motor 10 in FIG. 1. As the thermo-protector 12 and the removably attached mounting clip 84 are inserted through the receptacle opening and into the interior volume 114 of the receptacle, the attachment hook 94 projecting from the clip base 86 engages in the attachment hook opening 122 in the receptacle side wall. This releasably attaches the thermo-protector 12 and the modified mounting clip 82 to the switch housing 84. However, as the thermo-protector 12 and modified mounting clip 82 are inserted into the receptacle, the abutment 124 on the receptacle side wall edge 118 engages with the spring arm 106 on the mounting clip. As the mounting clip 82 and thermo-protector 12 are continued to be inserted into the receptacle volume 114, the spring arm 106 is resiliently flexed by the abutment 124. Thus, with the mounting clip 82 and the thermo-protector 12 removably attached to the modified switch housing 84 in their relative positions shown in FIG. 8, the resilience of the spring arm 106 exerts a force on the abutment 124 of the switch housing that biases the mounting clip 82 and the attached thermo-protector 12 away from the switch housing receptacle 112. This biasing force exerted by the spring arm 106 attenuates vibration of the mounting clip 82 and the attached thermo-protector 12 and its wiring during operation of the motor 10. The wiring leads 26, 38 of the circuit component 12 are next inserted into the wiring clasp assemblies 98 of the mounting clip. The spring force exerted by the spring arm 106 against the housing abutment 124 attenuates vibration of the mounting clip 82 and the rubbing together of the attached circuit component wiring leads 26, 38 that could wear away the insulation of the wiring leads and short circuit the motor. In this manner, the apparatus of the invention overcomes the disadvantages associated with the prior art mounting clip and switch housing.

While the present invention has been described by reference to a specific embodiment, it should be understood that modifications and variations of the invention may be constructed without departing form the scope of the invention defined in the following claims.

What is claimed:

1. An apparatus for mounting a circuit component to an electrical device, the apparatus comprising:
   a housing on the electrical device;
   a circuit component attached to the housing;
   a spring mechanism between the housing and the circuit component biasing the circuit component away from the housing;
   a mounting clip on the circuit component, the mounting clip being attached to the housing and thereby attaching the circuit component to the housing; and,
   the spring mechanism being a narrow, elongate spring arm having a length with opposite proximal and distal ends, the spring arm proximal end being connected to the mounting clip, the spring arm projecting from the mounting clip to the spring arm distal end and the spring arm distal end engaging with the housing.

2. The apparatus of claim 1, further comprising:
   the spring arm projecting from the mounting clip and defining an elongate slot between the spring arm and the mounting clip, the spring arm distal end engaging with the housing on an opposite side of the spring arm from the slot.

3. The apparatus of claim 1, further comprising:
   the housing having an edge adjacent the mounting clip and the circuit component and an abutment projecting from the edge, the abutment engaging with the spring arm distal edge.

4. An apparatus for reducing relative movement between wiring leads of an electric motor circuit component, the apparatus comprising:
   an electric motor having a stator with stator windings;
   a housing on the electric motor;
   a circuit component mounted on the housing, the circuit component having a wiring lead that extends between the circuit component and the stator windings;
   a spring mechanism between the circuit component and the housing, the spring mechanism being operatively attached to the wiring lead; and, mounting clip on the circuit component, the mounting clip being attached to the housing and thereby mounting the circuit component on the housing, the spring mechanism being on the mounting clip.

5. The apparatus of claim 4, further comprising:

the mounting clip being attached to the wiring lead and thereby attaching the spring mechanism to the wiring lead.

6. The apparatus of claim 4, further comprising:

the spring mechanism being an elongate spring arm that is cantilevered from the mounting clip.

7. The apparatus of claim 6, further comprising:

the housing having an abutment that projects away from the housing and the spring arm engaging with the abutment.

8. The apparatus of claim 4, further comprising:

the housing having a receptacle with an interior volume, the receptacle having a side wall that extends at least partially around the receptacle interior volume and the side wall having an edge that extends at least partially around an opening to the receptacle interior volume;

the circuit component and the mounting clip being at least partially inserted through the opening of the receptacle interior volume and into the receptacle interior volume; and the spring mechanism engaging with the receptacle side wall edge.

9. The apparatus of claim 8, further comprising:

an abutment on the receptacle side wall edge projecting away from the edge and the spring mechanism engaging with the abutment.

10. The apparatus of claim 9, further comprising:

the circuit component and the mounting clip being inserted in a first direction through the opening of the receptacle interior and into the receptacle interior volume and the abutment projecting in a second direction opposite the first direction from the receptacle side wall edge.

11. The apparatus of claim 10, further comprising:

the spring mechanism being an elongate arm projecting from the mounting clip to a distal end of the arm and the distal end of the arm engaging with the abutment.

12. The apparatus of claim 11, further comprising:

the elongate arm projecting from the mounting clip in a third direction that is transverse to the first and second directions.

13. The apparatus of claim 4, further comprising:

the mounting clip being removably attached to the circuit component and being removably attached to the housing.

14. The apparatus of claim 4, further comprising:

the mounting clip having a panel with a peripheral edge, a slot extending through a portion of the panel from the peripheral edge, and the spring mechanism being an integral portion of the panel adjacent the slot.

15. The apparatus of claim 14, further comprising:

the slot giving the spring mechanism portion of the panel a configuration of a narrow, elongate arm extending along the slot.

16. The apparatus of claim 14, further comprising:

the housing having an edge adjacent the mounting clip and the circuit component and having an abutment projecting from the edge, and the abutment engaging with the spring mechanism portion of the panel adjacent the slot.

17. The apparatus of claim 16, further comprising:

the abutment and the slot being positioned on opposite sides of the spring mechanism portion of the panel.

\* \* \* \* \*

UNITED STATES PATENT AND TRADEMARK OFFICE
CERTIFICATE OF CORRECTION

PATENT NO. : 6,853,560 B2
DATED : February 8, 2005
INVENTOR(S) : Borcherding et al.

It is certified that error appears in the above-identified patent and that said Letters Patent is hereby corrected as shown below:

Title page,
Illustrating figure(s) should be deleted, and substitutes therefore, the title page illustrating figure(s). (attached)

Drawings,
Delete drawing sheets 1-3, and substitute therefore, drawing sheets 1-3 (attached)

Signed and Sealed this

Tenth Day of May, 2005

JON W. DUDAS
*Director of the United States Patent and Trademark Office*

(12) United States Patent
Borcherding et al.

(10) Patent No.: US 6,853,560 B2
(45) Date of Patent: Feb. 8, 2005

(54) LIMITED MOVEMENT SYSTEM FOR MOTOR SWITCH MOUNTED THERMO-PROTECTOR

(75) Inventors: Gary W. Borcherding, Florissant, MO (US); Barry M. Newberg, Florissant, MO (US); Ranney Dohogne, Creve Coeur, MO (US); William R. Lewis, Hazelwood, MO (US); Paul G. Michaels, Arnold, MO (US)

(73) Assignee: Emerson Electric Co., St. Louis, MO (US)

(*) Notice: Subject to any disclaimer, the term of this patent is extended or adjusted under 35 U.S.C. 154(b) by 181 days.

(21) Appl. No.: 10/099,297

(22) Filed: Mar. 15, 2002

(65) Prior Publication Data

US 2003/0174486 A1 Sep. 18, 2003

(51) Int. Cl.[7] .................. H05K 7/02; H05K 7/04
(52) U.S. Cl. .............. 361/809; 361/752; 361/753; 361/758; 361/759; 361/801; 361/802
(58) Field of Search ............... 361/752, 753, 361/796, 785, 787, 809, 758, 759, 801, 802, 756

(56) References Cited

U.S. PATENT DOCUMENTS

| | | | |
|---|---|---|---|
| 4,214,389 A | | 7/1980 | Fitzgerald et al. |
| 5,088,190 A | * | 2/1992 | Malhi et al. ............... 29/843 |
| 5,537,294 A | * | 7/1996 | Siwinski ................... 361/753 |
| 5,659,459 A | * | 8/1997 | Wakabayashi et al. ...... 361/753 |
| 5,906,496 A | * | 5/1999 | DelPrete et al. ............ 439/95 |
| 6,036,536 A | | 3/2000 | Chiu |
| 6,276,965 B1 | * | 8/2001 | Madsen et al. ............. 439/607 |
| 6,456,504 B1 | * | 9/2002 | LoForte et al. ............. 361/799 |
| 6,462,952 B1 | * | 10/2002 | Ubukata et al. ............ 361/719 |

* cited by examiner

Primary Examiner—Amir Zarabian
Assistant Examiner—Thanh Y. Tran
(74) Attorney, Agent, or Firm—Thompson Coburn, LLP (57) ABSTRACT

A mounting clip that attaches a circuit component to an electrical device attenuates vibration of the circuit component as the electrical device is operated. The mounting clip is designed for a thermo-protector of an electric motor and removably attaches the thermo-protector to a switch housing of the electric motor. The thermo-protector is connected in the circuit of the electric motor and wiring of the electric motor that communicates with the thermo-protector is attached to the mounting clip. The mounting clip is provided with a spring mechanism that engages an abutment provided on the switch housing and biases the mounting clip and the attached thermo-protector and thermo-protector wiring away from the switch housing and thereby attenuates vibration of the thermo-protector and its wiring.

17 Claims, 3 Drawing Sheets